Oct. 17, 1967
C. E. GRIMES ET AL
3,347,558
STEERING MECHANISM
Filed Aug. 2, 1965
2 Sheets-Sheet 1
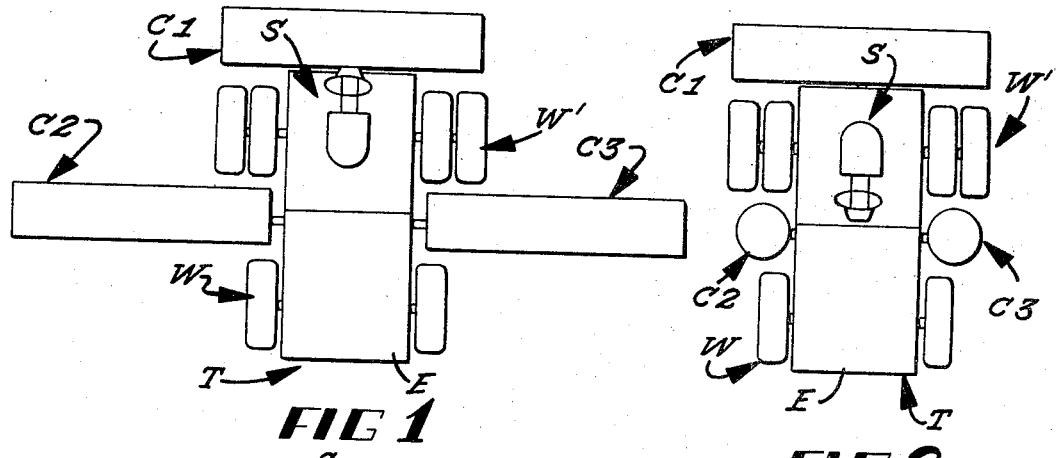
FIG 1
FIG 2
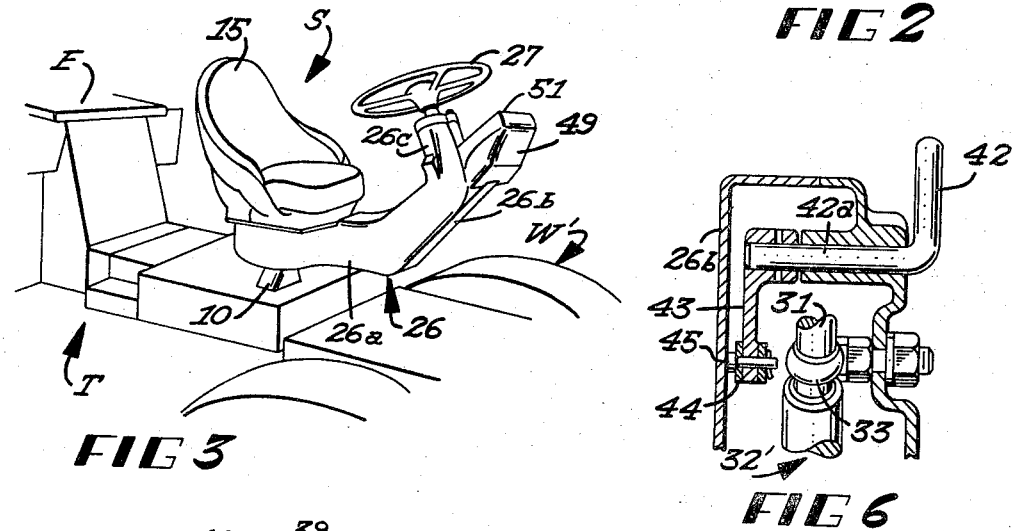
FIG 3
FIG 6
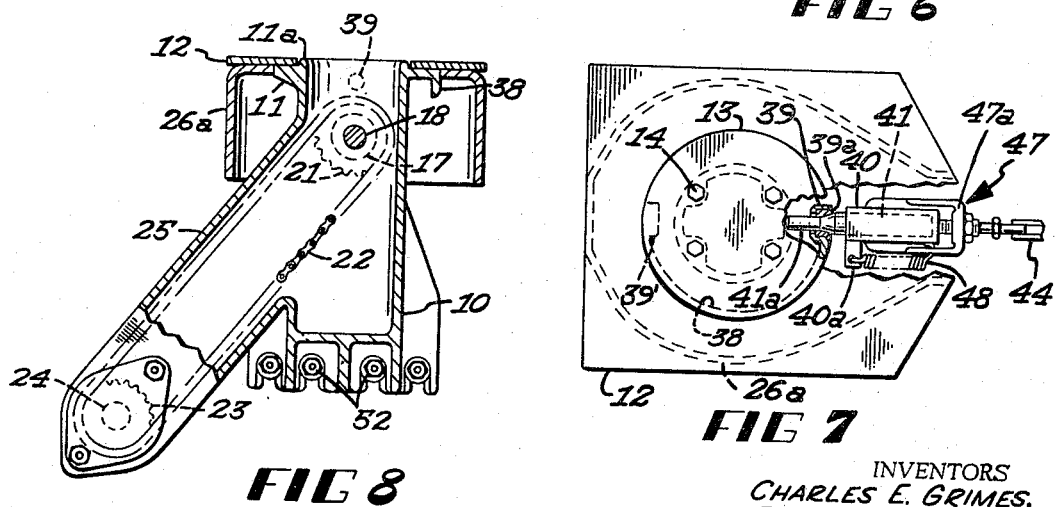
FIG 8
FIG 7
INVENTORS
CHARLES E. GRIMES,
RALPH W. SPEISER
BY
Vernon A. Johnson
ATTORNEY

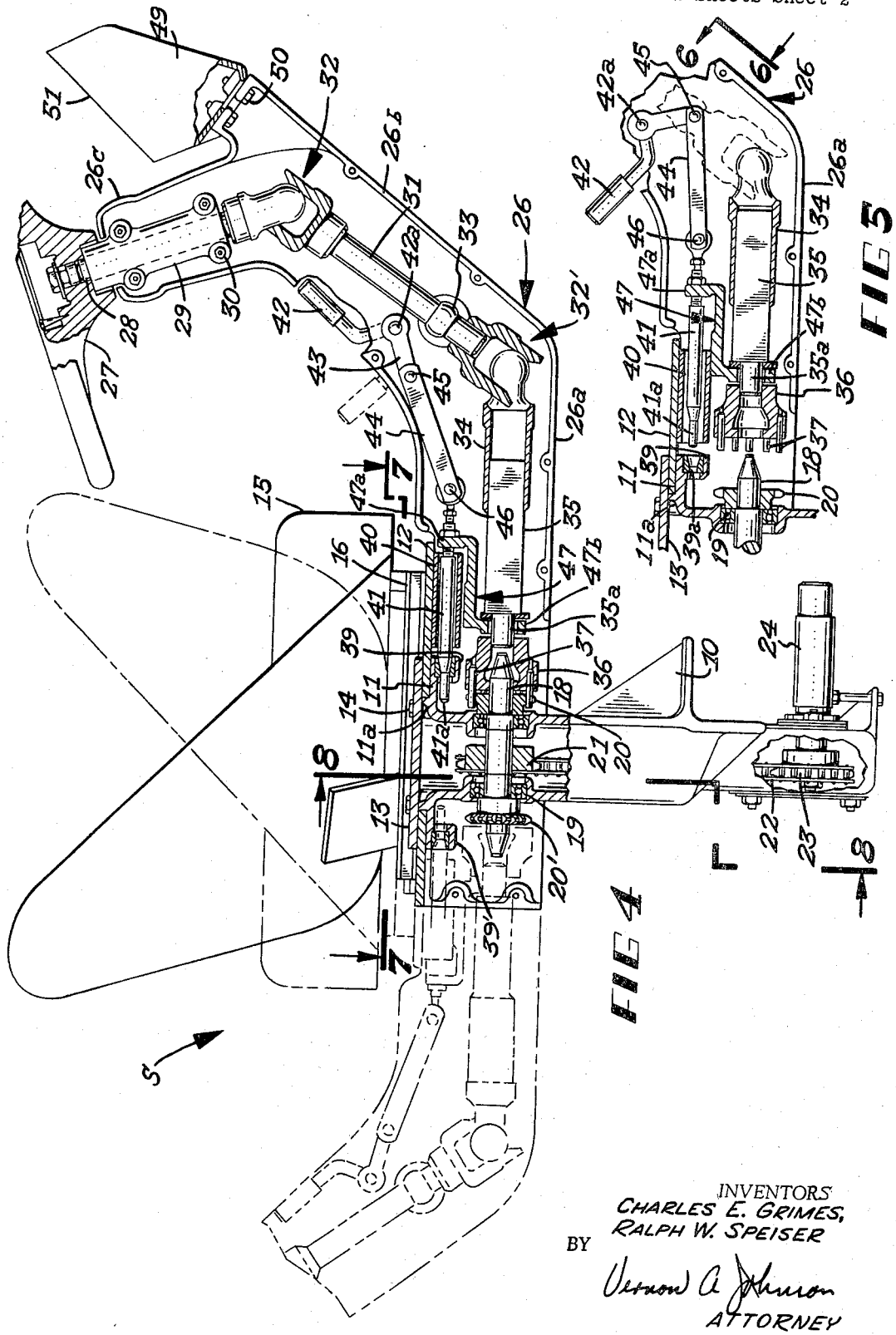

United States Patent Office
3,347,558
Patented Oct. 17, 1967

3,347,558
STEERING MECHANISM
Charles E. Grimes and Ralph W. Speiser, Minneapolis, Minn., assignors to Toro Manufacturing Corporation, Minneapolis, Minn., a corporation of Minnesota
Filed Aug. 2, 1965, Ser. No. 476,494
11 Claims. (Cl. 280—87)

ABSTRACT OF THE DISCLOSURE

A reversible seat and steering assembly which swings about a vertical axis between diametrically opposed positions, in one of which the operator faces one end of the vehicle and in the other faces the other end of the vehicle. The steering wheel is uncoupled from the steerable traction wheels during change of positions, a latch holds the assembly in each of these positions, and the latch is connected with the disconnectable coupling between the steering wheel and steerable traction wheels for simultaneous unlatching and uncoupling. The steering sense is reversed in each of these positions so that the steering wheel can bee manipulated in the conventional manner in each position.

---

This invention relates to a novel reversible seat and steering wheel assembly for vehicles, such as tractors, which are to be driven in opposite directions, which assembly enables the driver to always face in the direction of travel, and to use the same steering wheel or other steering control regardless of which direction the vehicle is driven.

The invention has particular applicability to tractor mounted gang mowers such as the one shown in the attached drawing and described hereinafter, although it is to be understood that the invention is not necessarily limited thereto.

When operating gang mowers during cutting, it is desirable to have rear steering for a number of reasons, including better control over the direction of movement of the gangs, particularly during turning, and to avoid leaving uncut strips between the gangs during turning. However, if the mower is to be driven any considerable distance during transport, particularly on heavily traveled roads or highways, it is preferable that the mower have front steering. In each instance, the operator should be facing in the direction of travel.

Another situation where this invention is particularly applicable is the case of a tractor having implement mounting means on one end thereof, and wherein it is desirable to be able to selectively push or pull the implement mounted thereon by reversing the direction in which the vehicle is driven.

It is, therefore, an object of this invention to provide a novel, reversible, seat and steering control assembly for reversibly driven vehicles which enables the operator to quickly, easily and selectively completely reverse his position relative to the vehicle so that he can always be facing in the direction of travel, and which enables him to use the same seat and same steering controls regardless of which direction he is facing.

Another object is to provide a swivel type seat and steering control assembly in which the seat and steering control swing simultaneously through 180 degrees of movement for reversing the position of the operator and steering controls, and which can be swung between the desired operational positions while the operator remains seated.

Still another object is to provide a reversible seat and steering control assembly in which the steering control is disengageable from the steerable traction wheels during change of position.

Still another object is to provide a reversible seat and steering control assembly which includes an instrument panel which makes the same gauges, switches, etc. available to the operator in each position.

Still another object is to provide a reversible seat and steering wheel assembly in which turning of the steering wheel in a given direction causes the steerable traction wheels to be turned in opposite directions when the position of said assembly is reversed.

These and other objects and advantages of the invention will more fully appear from the following description made in connection with the accompanying drawings wherein like character references refer to the same parts throughout the several views, and in which:

FIGURE 1 is a schematic top plan view of a tractor mounted gang mower embodying the reversible seat and steering control assembly of this invention with all of the cutting units lowered and the seat facing in the direction of travel for cutting, FIGURE 2 is a schematic top plan view of the mower of FIGURE 1 with the side cutting units in raised inoperative transport position and with the seat and steering control assembly reversed from their position of FIGURE 1 so that the mower can be driven from one place to another, FIGURE 3 is a right front perspective view of the seat and steering control assembly of FIGURE 1, FIGURE 4 is a side elevational view of the seat and steering control assembly of FIGURE 3 in transport position with portions thereof broken away for clarity of illustration with the steering controls operatively connected with the steerable traction wheels and the assembly locked in position, FIGURE 5 is a fragmentary side elevational view of the seat and steering control assembly of FIGURE 4 with the assembly unlocked and operatively disconnected from the steerable traction wheels to permit reversing of the position of the steering controls and seat, FIGURE 6 is a fragmentary front view of the latch and clutch actuating mechanism taken approximately along the line 6—6 of FIGURE 5, FIGURE 7 is a fragmentary top plan view of the steering column taken approximately on the line 7—7 of FIGURE 4, with portions broken away, FIGURE 8 is a vertical transverse sectional view taken approximately on the line 8—8 of FIGURE 4.

The illustrated mower is of the type oftentimes referred to as a highway mower and is particularly designed to cut grass, weeds and other foliage which grows along roads, highways and the like, and which must travel considerable distances on the road or highway when going to and from the cutting location. The illustrated mower includes a reverse drive tractor T which can be selectively driven in opposite directions on which are mounted three cutting units identified as C1, C2 and C3, respectively. The center unit C1 is mounted forwardly of one end of the tractor so that it will be positioned ahead of the tractor during cutting, and will be positioned rearwardly of the tractor during transport. The other cutting units C2 and C3 are mounted on opposite sides of the tractor between the front and rear wheels and are adapted to be swung from the lowered horizontal cutting position of FIGURE 1 to the raised inoperative vertical transport position of FIGURE 2. One end of the tractor is provided with a pair of steerable wheels W, and an engine E and the other end of the tractor is provided with sets of dual wheels W' mounted on opposite sides thereof. The tractor is also provided with a swivel type reversible seat and steering control assembly S constituting one preferred embodiment of this invention. For convenience of description, the end of the tractor on which the steerable wheels W are mounted is referred to as the front end of the tractor or vehicle, and the end on which the dual wheels W' and the cutting unit C1 are mounted is referred to as the rear end of the vehicle or tractor.

During cutting, the side cutting units C2 and C3 are lowered to ground engaging horizontal position and the seat and steering assembly S is positioned so as to face rearwardly of the vehicle as illustrated in FIGURE 1 so that the operator can face the direction of travel during cutting.

For transporting the vehicle from one place to another, the side cutting units C2 and C3 are raised to an upright position and the seat and steering assembly S is turned about and reversed so as to assume the transport position of FIGURE 2 so that the operator can again face the direction of travel during transport. Thus, during cutting, the steerable wheels W are located rearwardly of the vehicle with respect to the direction of travel to provide rear end steering, and are located forwardly of the vehicle during transport to provide front end steering during transport.

The seat and steering control assembly S of this invention includes an upstanding tubular pedestal 10 which is rigidly attached at its lower end to the tractor frame by means of bolts 52. The upper end of the pedestal is provided with a laterally extending circular flange 11 which has an upstanding annular circular guide or centering rib 11a spaced inwardly from the marginal edge thereof so as to define a circular annular track or supporting surface for slidably supporting thereon a swivel plate 12 having a circular opening formed therein for receiving the rib 11a. The swivel plate is held in position on the flange of the pedestal by means of a cover plate 13 attached to the pedestal flange 11 by means of a plurality of fasteners or bolts 14. The swivel plate has mounted on the top thereof an operator's seat 15, said seat having a base 16 which is attached to the swivel plate by any suitable means such as bolts (not shown) so as to be turnable with said swivel plate relative to the pedestal.

The pedestal is provided with a pair of diametrically opposed openings 17 which are oriented longitudinally of the vehicle so that one faces one end of the vehicle and the other opening faces the other end of the vehicle. A rotatable sprocket shaft 18 extends transversely of the pedestal through both of said openings and is rotatably supported on the pedestal by means of bearings 19. The outer end portions of the sprocket shaft 18 are provided with a pair of identical sprockets 20, 20', drivingly coupled thereto and located on opposite sides of the pedestal and which are adapted to be selectively coupled with the steering wheel in the manner hereinafter described. The shaft 18 is also provided with a sprocket 21 driven by said shaft and mounted on the central portion thereof interiorly of the pedestal. This sprocket 21 is drivingly connected to the steering mechanism or linkage for the steerable traction wheels W by means of a chain 22 trained thereabout and also about a sprocket 23 located below the sprocket 21, the sprocket 23 being drivingly connected to a stub shaft 24 which is operatively coupled to the steering gear for the steerable wheels W by any suitable means (not shown). The chain 22 and sprocket 23 are enclosed in a suitable housing 25 which extends laterally downwardly from the pedestal.

An elongate steering column 26 is provided with a rear horizontal portion 26a rigidly secured to the swivel plate 12, an upwardly and forwardly inclined intermediate portion 26b and an upwardly and rearwardly inclined front portion 26c. The steering column extends from underneath the seat forwardly thereof in substantial central alignment therewith, and is sufficiently narrow to enable it to be comfortably accommodated between the legs of the operator.

A steering wheel 27 is located adjacent the upper end portion of the front portion 26c of the steering column, within each reach of the operator seated in the seat 15, and is operatively connected to steering shaft means consisting of three operatively interconnected shaft sections as hereinafter described. The steering wheel is mounted on a steering shaft 28 which extends down into the portion 26c of the steering column, said steering shaft being rotatably supported and held in position by means of a bearing 29, said bearing being fastened to the steering column portion 26c by means of fastening bolts 30. A second steering shaft 31 is located in the intermediate portion 26b of the steering column, the steering shafts 28 and 31 being operatively connected by means of a conventional universal joint 32. The shaft 31 is held in position and operates in a bearing 33 supported by the intermediate portion 26b of the steering column.

A third steering shaft of extensible, retractable sectional formation is provided in the rear portion 26a of the steering column. This third steering shaft includes a sleeve 34 which is square in cross section and which has one end thereof connected to the shaft 31 by means of another conventional universal joint 32'. The first and third shafts have the same angular relationship to the intermediate second shaft for most effective transmittal of steering force. The other end of the square sleeve 34 slidably, telescopically and non-rotatably receives a square shaft 35. Thus, the shaft 35 and sleeve 34 are non-rotatable relative to each other whereby the shaft 35 is turned by turning of the sleeve 34. However, the shaft 35 is free to reciprocate longitudinally relative to the sleeve 34 to permit disengagement of the steering shaft from the steerable traction wheels during reversal of position, in a manner hereinafter described.

The rear end of shaft 35 is provided with a reduced cylindrical portion 35a to which is coupled a dog clutch 36 having a center opening for receiving either end portion of the sprocket shaft 18, and having a plurality of roll pins 37 extending outwardly from the face thereof and arranged circumferentially thereof for seating between and engaging the teeth of the sprockets 20 or 20'.

Detent or latch means are provided to hold the steering column and seat against movement in either of the selected operational positions.

To provide the desired latching means, the pedestal is provided with a depending semi-circular flange 38 which extends downwardly from the flange portion 11 of the pedestal. The flange 38 terminates with a pair of diametrically opposed sockets 39 and 39' which are provided with bushings 39a which are oriented longitudinally of the vehicle so that one socket faces one end of the vehicle and the other socket faces the other end of the vehicle. A plunger supporting sleeve 40 is mounted on the under side of the swivel plate 12, said sleeve having a plunger type latch member 41 mounted therein for reciprocation longitudinally thereof. One end of the plunger latch 41 is provided with a reduced end portion 41a which is adapted to be selectively seated in either of the sockets 39 or 39' to hold the seat and steering column in the desired operational position.

To actuate the plunger latch and retract same from locking engagement with the pedestal, an operating lever or handle 42 is provided which is located outside the steering column. This handle has a laterally extending arm 42a which extends into the steering column for rotation about a fixed axis, the arm 42a being operatively connected to a crank arm 43. This crank arm 43 is pivotally connected to one end of a link 44 by means of a pivot pin 45, the other end of the link 44 being pivotally connected to the plunger by means of a pivot pin 46. When the seat and steering column are locked to the pedestal, the handle 42 is in the solid line position of FIGURE 4. To unlock the assembly, and disengage the plunger from the pedestal socket, the operator pulls the handle 42 rearwardly towards him. This causes the crank arm 43 to swing downwardly and forwardly and thereby pulls link 44 and the plunger 41 forwardly to a point where the detent portion 41a of the plunger is completely retracted from the detent socket 39 or 39′ as shown in FIGURE 5.

To turn the seat and steering column to reverse the position thereof, the clutch 36 must be disengaged from whichever sprocket 20 or 20′ with which it is engaged. To accomplish the uncoupling of the clutch from the sprockets, a carrier or clutch actuator 47 is provided which has an upstanding collar portion 47a operatively connected with the plunger and which has a depending collar portion 47b which has a circular opening for rotatably receiving the reduced cylindrical portion 35a of the steering shaft to permit said portion to turn freely relative to the collar 47b, the collar 47b also serving to support the rear steering shaft section and clutch in the desired operative position in alignment with sprockets 20 or 20′. When the plunger is retracted as hereinbefore described, the clutch actuator 47 is simultaneously retracted, causing the collar 47b thereof to thrust rearwardly against the square shaft 35 and push same into the sleeve 34. Because the clutch is coupled to the shaft 35, it is also retracted by this movement, causing the clutch to become uncoupled from sprockets 20 or 20′ and retracting the clutch far enough so that the entire clutch, including roll pins 37 thereof, is free and clear of the sprocket shaft 18. An extension spring 48 (shown in FIGURE 7 is provided, one end of the spring being connected to the member 47, the other end of the spring being attached to a laterally extending tab 40a of the sleeve 40 so as to bias the plunger towards engagement with one of the detent sockets and to bias the clutch towards engagement with one of the sprockets 20 or 20′.

The steering column has an instrument box 49 mounted thereon by means of fastening bolts 50. This instrument box is provided with an instrument panel 51 located outwardly of the steering wheel within convenient view of the operator, which instrument panel has mounted thereon the usual gages (not shown) such as an ammeter, oil pressure gage, a tachometer and a temperature and fuel gage. The ignition switch is also mounted on the instrument panel. The wiring (not shown) for the various instruments extends through the steering column and is sufficiently flexible to be freely movable therewith.

In FIGURE 4, the seat and steering column are shown in transport position, that is, facing the front end of the vehicle (that end carying the steerable traction wheels W) with the steering column and seat locked to the pedestal and the clutch in coupled engagement with the sprocket 20. To reverse the position of the seat and the steering column to cutting position, the operator pulls the handle 42 towards himself to the dotted line position of FIGURE 4 thereby unlocking the latch mechanism and uncoupling the clutch from the sprocket 20 to permit turning of the seat and steering column, the various parts assuming the unlocked, uncoupled positions illustrated in FIGURE 5. The operator can then swing the steering column and seat about the pedestal through 180 degrees movement while remaining seated (during which movement the plunger may ride on the outer face of flange 38), until the plunger is aligned with detent socket 39 and the clutch is aligned with sprocket 20′. As soon as the plunger and clutch are aligned with their respective sockets 39′ and sprocket 20′, the spring pulls the plunger into engagement with socket 39′ and the clutch into engagement with sprocket 20′. In this position, the seat and steering column assume the broken line position of FIGURE 4 in which they are in the cutting position facing rearwardly of the vehicle, that is facing that end carrying the dual wheels W′.

Front steering requires that the traction steering wheels W be turned in a direction opposite to that for rear steering to effect the same direction of turn. However, it is desirable for the operator to be able to turn the steering wheel 27 in the same direction to accomplish the same direction of turning, regardless of which direction he is facing when the vehicle is traveling. That is, he should, regardless of position, be able to turn the steering wheel to the right to effect a right turn, and turn the steering wheel to the left to effect a left turn. This is accomplished in the illustrated embodiment by the fact that the sprocket 21 is driven in opposite directions by the same directional turning of steering wheel 27 depending upon which sprocket 20 or 20′ is engaged by the clutch.

In the illustrated embodiment, the seat 15 has a backrest, and therefore must be turned or reversed in order to enable the operator to comfortably occupy same in each operational position. However, the invention is also applicable to vehicles in which the seat does not have a backrest, and which can be comfortably occupied in either operational position without reversing same. In such a case, the seat may remain fixed, with the steering column being turnable relative thereto, with the operator simply shifting his position on the seat when reversing positions. Also, the seat, if turnable, may be mounted for turning independently of the steering column.

It will, of course, be understood that various changes may be made in the form, details, arrangement and proportion of the various parts without departing from the scope of this invention.

What is claimed is:
1. In a vehicle adapted to be driven in opposite directions and having steerable traction means for turning said vehicle,
    an operator's seat,
    a steering column supporting said seat in fixed relationship therewith,
    a steering wheel carried by said column and located opposite the font of said seat,
    a steering shaft carried by said column,
    one end of said steering shaft being operatively connected to said steering wheel,
    the other end of said steering shaft having first clutch means mounted thereon,
    a latch member carried by said column,
    pedestal means supporting said steering column for swinging movement relative thereto,
    said steering column and seat being swingable simultaneously relative to said pedestal about a vertical axis between two operational positions in which the operator faces opposite ends of said vehicle,
    second clutch means supported by said pedestal means and operatively connected to said traction means,
    said second clutch means being engageable by said first clutch means in each of said operational positions,
    means carried by said pedestal means and adapted to lockingly engage said latch member in each of said operational positions,
    and means carried by said column for simultaneously disengaging said clutch means and said latch member in each of said operational positions to permit movement of said steering column and seat between said operational positions.

2. In a vehicle adapted to be driven in opposite directions and having steerable traction means for turning said vehicle,
    an operator's seat,
    a steering column supporting said seat in fixed relationship therewith,
    a steering wheel carried by said column and located opposite the front of said seat,
    a steering shaft carried by said column,
    one end of said steering shaft being operatively connected to said steering wheel,
    the other end of said steering shaft having a clutch mounted thereon,
    pedestal means supporting said steering column for swinging movement relative thereto,
    said steering column and seat being swingable simultaneously about a vertical axis between two operational positions in which the operator faces opposite ends of said vehicle, three coaxial sprockets supported by said pedestal means, said sprockets being drivingly connected for simultaneous rotation and arranged in series longitudinally of said vehicle, the middle sprocket being operatively connected to said traction means for turning said vehicle in response to rotation of said middle sprocket, the outer sprockets being adapted to be selectively engaged by said clutch in each of said operational positions for driving said middle sprocket in response to the turning of said steering wheel.

3. In a vehicle adapted to be driven in opposite directions and having steerable traction means for turning said vehicle, an operator's seat, a steering column supporting said seat in fixed relationship therewith, a steering wheel carried by said column and located opposite the front of said seat, a steering shaft carried by said column, one end of said steering shaft being operatively connected to said steering wheel, the other end of said steering shaft having first clutch means mounted thereon, pedestal means supporting said steering column for swinging movement relative thereto, said steering column and seat being swingable simultaneously relative to said pedestal about a vertical axis between two operational positions in which the operator faces opposite ends of said vehicle, second clutch means supported by said pedestal means and operatively connected to said traction means and adapted to be engaged by said first clutch means in each of said operational positions, and detent means for preventing movement of said steering column in each of said operational positions, said detent means including a pair of diametrically opposed sockets formed in said pedestal means and oriented longitudinally of said vehicle, an elongate longitudinally reciprocable latch member carried by said column and adapted to be selectively seated in said sockets in each of said operational positions, and actuating means carried by said column and operatively connected to said latch member for moving same into and out of locking engagement with said socket.

4. The vehicle of claim 3, wherein said actuating means is also operatively connected to said first clutch means and is adapted to move same into engagement with a second clutch means simultaneously with its movement of the latch member into locking engagement with a socket and is adapted to move said first clutch means out of engagement with a second clutch means simultaneously with its movement of said latch member out of locking engagement with a socket.

5. In a vehicle adapted to be driven in opposite directions and having steerable traction means for turning said vehicle, an operator's seat, a steering column supporting said seat in fixed relationship therewith, a steering wheel carried by said column and located opposite the front of said seat, a steering shaft carried by said column, one end of said steering shaft being operatively connected to said steering wheel, the other end of said steering shaft having a clutch mounted thereon, pedestal means supporting said steering column for swinging movement relative thereto, said steering column and seat being swingable simultaneously about a vertical axis between two operational positions in which the operator faces opposite ends of said vehicle, three coaxial sprockets supported by said pedestal means, said sprockets being drivingly connected for simultaneous rotation and arranged in series longitudinally of said vehicle, the middle sprocket being operatively connected to said traction means for turning said vehicle in response to turning of said middle sprocket, the outer sprockets being adapted to be selectively engaged by said clutch in each of said operational positions for driving said middle sprocket in response to the turning of said steering wheel, detent means for preventing movement of said steering column in each of said operational positions, said detent means including a pair of diametrically opposed sockets formed in said pedestal means and oriented longitudinally of said vehicle, and an elongated longitudinally reciprocable latch member carried by said column and adapted to be selectively seated in said sockets in each of said operational positions, and actuating means carried by said column and operatively connected to said latch member and said clutch, said actuating means being adapted to simultaneously move said clutch and latch member into and out of engagement with their respective sprocket and socket in each of said operational positions.

6. In a vehicle adapted to be driven in opposite directions and having steerable traction means for turning said vehicle, a pedestal, a swivel plate mounted on said pedestal, an operator's seat mounted atop said swivel plate and movable simultaneously therewith, said swivel plate being turnable relative to said pedestal through 180 degrees of movement between two diametrically opposed operating positions in which the seat faces opposite ends of said vehicle, an elongate steering column oriented in the same direction as said seat and extending outwardly thereof and supported by said swivel plate for simultaneous movement therewith, said steering column including a horizontal rear portion attached to said plate, an upwardly and forwardly inclined intermediate portion, and a front portion inclined upwardly and rearwardly towards said seat, a steering shaft composed of rear, intermediate and front sections which are respectively mounted in the rear, intermediate and front end portions of said column and generally oriented in the same direction as their respective portions of said column, the outer end portion of said front section having a steering wheel operatively connected thereto, universal joint means operatively connecting the intermediate shaft section to the front and rear shaft sections, a first clutch member operatively mounted on the rear end of said rear section, a pair of second clutch members supported by said pedestal on opposite sides thereof in longitudinal alignment with said vehicle and operatively connected to said steerable traction means and adapted to be selectively engaged by said first clutch member in each of said operating positions, a latch carried by said column, a pair of sockets formed on opposite sides of said pedestal for selectively receiving said latch and holding said steering column against movement in each of said operating positions, and actuating means carried by said column for disengaging said latch from said sockets and said first clutch from said second clutches to permit turning of said steering column and seat between said operating positions.

7. The vehicle of claim 6, wherein said latch is an elongate member longitudinally reciprocable into and out of locking engagement with said socket,
the rear steering shaft section is longitudinally extensible and retractable to permit movement of the first clutch member mounted thereon into and out of engagement with said second clutch members,
spring means biasing said latch member and first clutch member toward engagement with their respective socket and second clutch member in each of said operational positions,
and said actuating means carried by said column simultaneously moves said latch member and first clutch member out of engagement with their respective socket and second clutch member in each of said operational positions.

8. In a vehicle adapted to be driven in opposite directions and having means for turning said vehicle,
an operator's seat which enables the operator to selectively face opposite ends of said vehicle in either of two operational positions,
and manually operable control means operatively connectible with said means for turning said vehicle,
said control means being selectively movable between said operational positions so as to be within reach of the operator occupying said seat regardless of which end of the vehicle he is facing,
detent means for holding said control means in each of said operational positions,
clutch means for selectively operatively connecting said control means with said turning means in each of said operational positions,
and means for simultaneously unlocking said detent means and disengaging said clutch means to permit movement of said control means between said operational positions.

9. In a self-propelled vehicle adapted to be driven in opposite directions and having steerable traction means for turning said vehicle,
an operator's seat which is selectively occupyable by the operator in either of two operational positions in which he faces opposite ends of said vehicle,
a steering column assembly which includes a steering shaft and steering wheel operatively connected to said shaft,
said assembly being swingable about a vertical axis between two operational positions corresponding to the aforementioned positions occupyable by the operator whereby the steering wheel can be positioned in front of the operator regardless of which direction he is facing,
means for operatively coupling said steering shaft with said steerable traction means in each of said positions,
means for locking said assembly against swinging movement in each of said positions, and
means for uncoupling said shaft from said steerable traction means and unlocking said assembly in each of said positions to permit movement of said assembly between said positions, and wherein said assembly includes an instrument panel viewable by the operator in each of said operational positions.

10. A vehicle adapted to be driven in opposite directions having steerable traction wheels located at one end thereof and non-steerable traction wheels at the other end thereof,
three elongate transversely oriented cutting units supported by said vehicle,
one of said units being mounted outwardly of said other end of said vehicle along and symmetrically of the longitudinal centerline thereof,
the other two units extending laterally from opposite sides of said vehicle from a point intermediate said steerable and nonsteerable wheels,
an operator's seat which enables the operator to selectively face opposite ends of said vehicle in either of two operational positions,
and manually operable control means operatively connectable by clutch means with said means for turning said vehicle,
said control means being selectively movable between said operational positions so as to be within reach of the operator occupying said seat regardless of which end of the vehicle he is facing.

11. In a vehicle adapted to be driven in opposite directions and having steerable traction means for turning said vehicle,
an assembly comprising an operator's seat and steering column in fixed relationship to each other,
a steering wheel carried by said column and located opposite the front of said seat,
a steering shaft carried by said column,
one end of said steering shaft being operatively connected to said steering wheel,
the other end of said steering shaft having first clutch means mounted thereon,
means supporting said assembly for movement about a vertical axis between two operational positions in which the operator faces opposite ends of said vehicle,
second clutch means in fixed relationship to said vehicle operatively connected to said traction means for steering said vehicle,
said first clutch means moving relative to said second clutch means when said assembly moves between said operational positions,
said second clutch means being engageable by said first clutch means in each of said operational positions,
and means for reciprocating said clutch means relative to each other into and out of driving engagement with each other at each of said operational positions the engagement of said clutch means in one of said positions being the reverse of the engagement of said clutch means in the other of said positions whereby the steering sense is reversed in each of said positions so that the steering wheel can be manipulated in the conventional manner in each of said positions, the reversal of said steering sense being effected by the change in said operational positions of said assembly and first clutch means.

References Cited
UNITED STATES PATENTS

| | | | |
|---|---|---|---|
| 2,384,890 | 9/1945 | Coldwell | 180—77 |
| 2,607,432 | 8/1952 | Lommel | 180—77 X |
| 2,984,311 | 5/1961 | Wehsely et al. | 180—77 X |
| 3,023,561 | 3/1962 | Gustafson | 56—6 |
| 3,063,173 | 11/1962 | Wardle. | |
| 3,195,913 | 7/1965 | Hallsworth | 280—87 |
| 3,218,787 | 11/1965 | Van Der Lely | 56—6 |

KENNETH H. BETTS, *Primary Examiner.*